United States Patent
Naber

(10) Patent No.: US 8,393,628 B2
(45) Date of Patent: Mar. 12, 2013

(54) AXLE ASSEMBLY AND SUSPENSION ARM

(75) Inventor: Thomas Naber, Ahaus (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 41 days.

(21) Appl. No.: 12/991,312

(22) PCT Filed: May 7, 2009

(86) PCT No.: PCT/EP2009/003263
§ 371 (c)(1),
(2), (4) Date: Dec. 14, 2010

(87) PCT Pub. No.: WO2009/135670
PCT Pub. Date: Nov. 12, 2009

(65) Prior Publication Data
US 2011/0121534 A1 May 26, 2011

(30) Foreign Application Priority Data
May 7, 2008 (DE) .......................... 10 2008 022 657

(51) Int. Cl.
*B60G 11/32* (2006.01)
(52) U.S. Cl. ................................. 280/124.162
(58) Field of Classification Search ........... 280/124.116, 280/124.128, 124.157, 124.162; 267/64.15, 267/64.19, 64.21, 64.23, 64.24, 64.27
See application file for complete search history.

(56) References Cited

U.S. PATENT DOCUMENTS

| 2,893,104 | A | * | 7/1959 | Hancock | .................. 267/256 |
| 3,510,149 | A | * | 5/1970 | Raidel | .................. 280/86.75 |
| 3,599,955 | A | * | 8/1971 | Yew | .................. 267/44 |
| 4,634,142 | A | | 1/1987 | Woods et al. | |
| 4,722,548 | A | * | 2/1988 | Hamilton et al. | .......... 267/64.15 |
| 4,858,948 | A | | 8/1989 | Raidel | |
| 4,993,694 | A | * | 2/1991 | Gandiglio et al. | ......... 267/64.24 |
| 6,086,077 | A | * | 7/2000 | Stuart | .................... 280/124.116 |
| 6,089,552 | A | * | 7/2000 | Pahl | .................. 267/64.24 |
| 6,237,926 | B1 | | 5/2001 | Pritchard et al. | |
| 6,715,744 | B2 | * | 4/2004 | Bell | .................. 267/64.15 |
| 2004/0155425 | A1 | | 8/2004 | Schluntz | |

(Continued)

FOREIGN PATENT DOCUMENTS

| DE | 198 09 281 | 9/1999 |
| DE | 101 06 350 | 8/2002 |

(Continued)

OTHER PUBLICATIONS

European Patent Office, International Preliminary Report on Patentability and Written Opinion, Nov. 18, 2010, from International Patent Application No. PCT/EP2009/003263, filed on May 7, 2009.

(Continued)

*Primary Examiner* — Paul N Dickson
*Assistant Examiner* — Robert A Coker
(74) *Attorney, Agent, or Firm* — Kenyon & Kenyon LLP

(57) ABSTRACT

An axle assembly for a vehicle is described, in which the axle assembly has a suspension arm for accommodating an axle of the vehicle and a damper. The damper is coupled to a first engagement point of the suspension arm. The first engagement point is situated on the suspension arm so that the damper may be situated outside an installation space for axle components located between the suspension arm and a chassis of the vehicle.

18 Claims, 1 Drawing Sheet

U.S. PATENT DOCUMENTS

2006/0163834 A1* 7/2006 Brereton et al. ........ 280/124.128
2008/0211149 A1* 9/2008 Hujer et al. ................ 267/64.23

FOREIGN PATENT DOCUMENTS

| | | |
|---|---|---|
| EP | 0 162 511 | 11/1985 |
| FR | 2 630 681 | 11/1989 |
| GB | 831 657 | 3/1960 |
| GB | 2 194 761 | 3/1988 |

OTHER PUBLICATIONS

European Patent Office, Translation of International Preliminary Report on Patentability and Written Opinion, Dec. 29, 2010, from International Patent Application No. PCT/EP2009/003263, filed on May 7, 2009.

* cited by examiner

AXLE ASSEMBLY AND SUSPENSION ARM

FIELD OF THE INVENTION

The present invention relates to an axle assembly and a suspension arm which may be used in vehicles.

BACKGROUND INFORMATION

Commercial vehicle axles often have the problem that essential axle components such as disc brakes, brake cylinders and drum brake camshafts must be placed in areas subject to striking rocks or dirt contamination because other components such as suspension arms and dampers require the necessary installation space.

German Patent document DE 101 06 350 A1 discusses an axle suspension system for rigid axles of commercial vehicles. A longitudinal member is connected to a vehicle frame. An air spring is situated on the longitudinal member and behind a tire. The spring is situated between the longitudinal member and a four-way connector. A shock absorber system is provided downstream from the spring.

German Patent document DE 198 09 281 A1 discusses a chassis of a heavy-duty commercial vehicle. Spring damper struts are each connected at the top end to a spring strut holder attached to the vehicle frame and at the bottom end to a linkage point on the rigid axle body; in particular the spring damper struts are connected as far to the outside as possible to achieve the greatest possible distance between spring centers. The spring damper struts each have an air spring or helical spring and a corresponding coaxial shock absorber.

FIG. 2 shows an axle assembly of a vehicle which includes a suspension arm 102 and an axle 104. Suspension arm 102 is movably connected to a vehicle frame or chassis 106 of the vehicle using a trestle 108. A bellows 112 is situated on chassis 106 to cushion a motion of suspension arm 102 relative to chassis 106. A damper 114 is situated between suspension arm 102 and trestle 108. An installation space occupied by damper 114 is not available to other axle components. In the customary damper position illustrated in FIG. 2, a disc brake 116 is therefore situated in an unfavorable position below suspension arm 102.

The system of damper 114 illustrated in FIG. 2 results in higher wear and faster functional impairment or functional incapacity of the axle components.

This problem often goes completely unresolved today. It is often associated today with frequent maintenance intervals and short service life as well as risk of damage. Other approaches provide for situating the suspension arm in a lower position, it frequently being necessary to situate the brake cylinder at an angle, which results in additional costs. Other constructions in connection with suspension arm designs made of sheet steel guide the cylinder through the suspension arm for protection. This also results in substantial costs.

SUMMARY OF THE INVENTION

An object of the exemplary embodiments and/or exemplary methods of the present invention is to provide a device for a vehicle which enables a damper to be situated more advantageously.

This object is achieved by a device according to the description herein.

The exemplary embodiments and/or exemplary methods of the present invention is based on the idea that a damper may be situated in such a way that an installation space above a suspension arm may be used for axle components. The axle components may thus be advantageously situated above the suspension arm, and they are protected to a much greater degree in this manner against striking rocks and dirt contamination.

The exemplary embodiments and/or exemplary methods of the present invention provides a device for a vehicle having the following features:

A suspension arm for accommodating an axle of the vehicle, it being possible to movably connect the suspension arm to a chassis of the vehicle;

A plurality of axle components situated between the suspension arm and the chassis, the plurality of axle components including a disc brake, a brake cylinder and/or camshafts of a brake;

A damper which may be connected to the chassis and which is coupled to a first engagement point of the suspension arm, the first engagement point of the suspension arm being situated downstream from the axle in the direction of travel and being situated on the suspension arm in such a way that the damper may be situated outside an installation space for axle components located between the suspension arm and a chassis of the vehicle; and A spring which may be connected to the chassis and which is coupled to a second engagement point of the suspension arm, a distance between the first engagement point and the axle being equal to or greater than a distance between the second engagement point and the axle, and the first and second engagement points being situated on the same side of the suspension arm in relation to the axle.

The device according to the present invention may represent an axle assembly for a vehicle, having a suspension arm for accommodating an axle of the vehicle and a damper which is coupled to a first engagement point of the suspension arm, the first engagement point being situated on the suspension arm in such a way that the damper may be situated outside an installation space for axle components located between the suspension arm and a chassis of the vehicle.

The suspension arm for accommodating an axle of a vehicle may have an engagement point for coupling a damper, the engagement point being situated on the suspension arm in such a way that the damper may be situated outside an installation space for axle components located between the axle and a chassis of the vehicle.

Exemplary embodiments of the present invention are explained in greater detail below with reference to the attached drawings.

DETAILED DESCRIPTION

Figure 1:
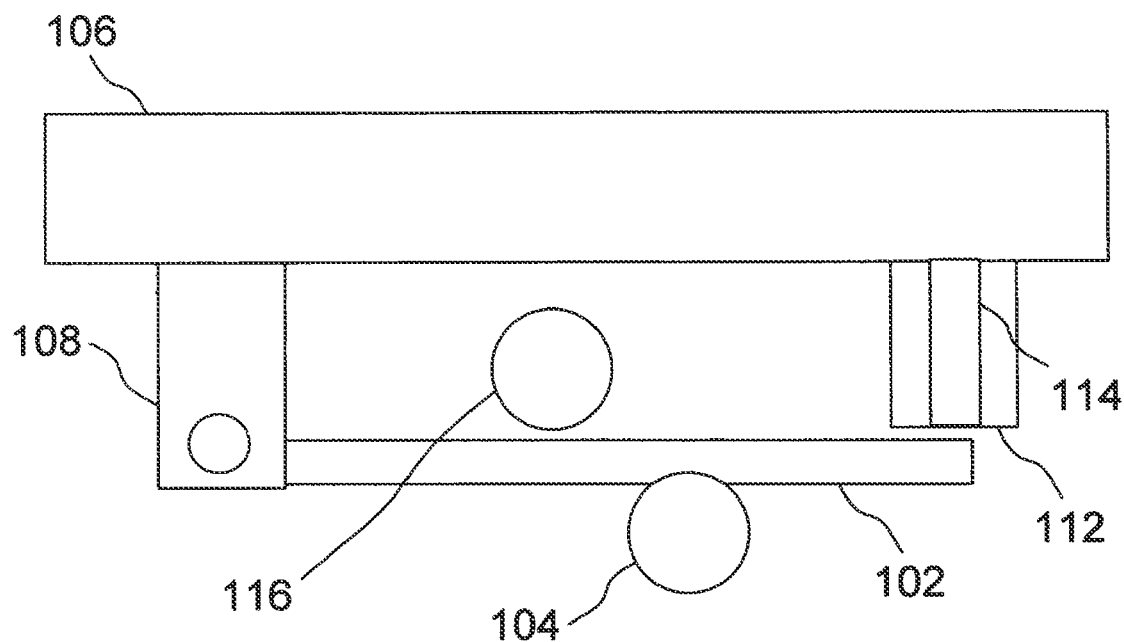
FIG. 1 shows a representation of the damper system according to the present invention.

In the following description of the exemplary embodiments of the present invention, identical or similar reference numerals are used for the elements illustrated in the different drawings and having a similar function, these elements not being described repeatedly.

FIG. 1 shows an axle assembly for a vehicle according to an exemplary embodiment of the present invention. The axle assembly has a suspension arm 102 for accommodating an axle 104 of the vehicle. The suspension arm may be movably connected to a chassis 106 of the vehicle. For this purpose, a trestle 108 may be connected to chassis 106, and one end of suspension arm 102 may be movably attached to trestle 108. The axle assembly may have a spring 112 and a damper 114. Spring 112 and damper 114 may be designed to cushion or dampen a motion of suspension arm 102 and thus also a motion of axle 104 relative to chassis 106. According to the exemplary embodiments and/or exemplary methods of the present invention, axle components 116 are situated in an installation space above suspension arm 102, i.e., in an area between axle 104 and chassis 106. Axle components 116 may be components which are situated near the axle due to their functionality.

Suspension arm 102 has a first engagement point for coupling damper 114. The first engagement point may be designed to provide a connection between suspension arm 102 and damper 114. According to the exemplary embodiments and/or exemplary methods of the present invention, the first engagement point is situated on suspension arm 102 in such a way that damper 114 may be situated outside the installation space which is located between axle 104 and chassis 106 and is suitable for situating axle components 116. For example, the first engagement point may be situated on suspension arm 102 downstream from an accommodation point of axle 104 in the direction of travel.

Suspension arm 102 may have a second engagement point to which spring 112, including suspension arm 102, may be coupled. A distance between the first engagement point and axle 104 may be equal to or greater than a distance between the second engagement point and axle 104. Damper 114 may thus be situated at at least the same distance from axle 104 as spring 112. According to the exemplary embodiment illustrated in FIG. 1, spring 112 and damper 114 are situated at one end of suspension arm 102, which is diametrically opposed to trestle 108. Axle 104 is situated between the two ends of suspension arm 102.

The damping function may thus be situated downstream from axle 104 between the longitudinal member and suspension arm 102 without being laterally offset. For this purpose, suspension arm 102 may have a straight shape. Suspension arm 102 may be situated parallel to a plane which extends through the longitudinal vehicle axis and the vertical vehicle axis. A connecting point of suspension arm 102 may thus be situated on chassis 106, e.g., above trestle 108, a connecting point of axle 104 may be situated on suspension arm 102, and the first and second engagement points may be situated on one line.

Spring 112 may be situated between chassis 106 and suspension arm 102 and be connected to chassis 106. Damper 114 may be situated within spring 112. Damper 114 and spring 112 may form a combined component, or they may be designed separately. Depending on the design of damper 114, damper 114 may be connected to chassis 106 and/or suspension arm 102. Alternatively, damper 114 may be designed as a separate component and be situated outside spring 112. For example, damper 114 may be situated downstream from spring 112 in relation to axle 104. Spring 112 may thus be situated between axle 104 and damper 114. It is also possible to situate damper 114 upstream from spring 112 in relation to axle 104, but at a sufficient distance from axle 104 to prevent damper 114 from blocking the installation space provided for axle components 116 above suspension arm 102.

According to the exemplary embodiments and/or exemplary methods of the present invention, it is not necessary to position suspension arm 102 in a lower location. In particular, the engagement points of spring 112 and of damper 114 on the suspension arm may be situated in a position which lies above a center point of axle 104.

According to the exemplary embodiment illustrated in FIG. 1, spring 112 is a bellows, for example an air bellows. Axle components 116 include a disc brake. As an alternative or in addition, axle components 116 may include, for example, a disc brake, a brake cylinder and/or camshafts of a brake. The damper may be a hydraulic damper.

In a damper 114 which is integrated into bellows 112, bellows 112, and not damper 114, may have a length-determining function. The length of bellows 112 may be predefined by a rest distance between suspension arm 102 and chassis 106. Damper 114 may have the same length as bellows 112 or it may be shorter in length. Damper 114 may thus be fully integrated into bellows 112 or into an installation space of bellows 112, even in terms of length.

Figure 2:
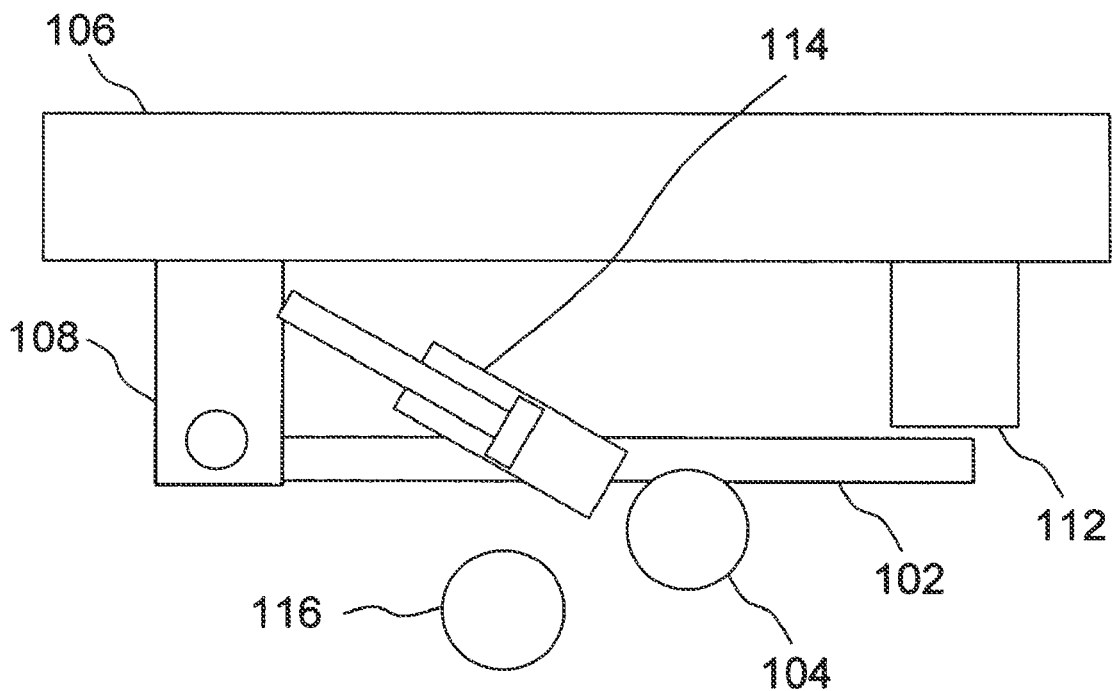
FIG. 2 shows a representation of a damper system according to the related art.

The position of disc brake 116 illustrated in FIG. 2 in the case of an integrated damper 112, 114 and, in particular, the illustrated situation of the disc brake at a damper engagement point downstream from axle 104, viewed in the direction of travel, has been selected only by way of example. According to the exemplary embodiments and/or exemplary methods of the present invention, a position of damper 114 within bellows 112 or also downstream from bellows 112 is advantageous, since axle components 116, such as disc brakes or camshafts for drum brakes, may be moved to a position above the suspension arm.

The exemplary embodiments described have been selected only by way of example and may be combined with each other.

THE LIST OF REFERENCE NUMERALS IS AS FOLLOWS

102 Suspension arm
104 Axle
106 Chassis
108 Trestle
112 Bellows
114 Damper
116 Axle components

What is claimed is:
1. A device for a vehicle, comprising:
a suspension arm for accommodating a drive axle of the vehicle, wherein the suspension arm is movably connectable to a chassis of the vehicle;
a plurality of axle components situated between the suspension arm and the chassis, wherein the plurality of axle components include at least one of a disc brake, a brake cylinder and a camshaft of a brake;
a damper which is connectable to the chassis and which is coupled to a first engagement point of the suspension arm, wherein the first engagement point is situated downstream from the axle in a direction of travel and is situated on the suspension arm so that the damper may be situated outside an installation space for axle components located between the suspension arm and the chassis of the vehicle; and
a spring which is connectable to the chassis and which is coupled to a second engagement point of the suspension arm, wherein a distance between the first engagement point and the axle is equal to or greater than a distance between the second engagement point and the axle, and wherein the first engagement point and the second engagement point are situated on a same side of the suspension arm in relation to the axle;
wherein the suspension arm is straight.

2. The device of claim 1, wherein the first engagement point and the second engagement point are situated on the suspension arm in a position which lies above a center point of the axle.

3. The device of claim 1, wherein the first engagement point is situated downstream from the second engagement point in relation to the axle.

4. The device of claim 1, wherein the damper is situated within the spring.

5. The device of claim 1, wherein the spring is a bellows.

6. The device of claim 5, wherein the damper is situated completely within the bellows.

7. The device of claim 1, wherein the axle components are situated between the axle and the chassis.

8. The device of claim 1, wherein a connecting point of the suspension arm is situated on the chassis, a connecting point of the axle is situated on the suspension arm, and the first and second engagement points are situated on one line.

9. The device of claim 1, wherein the first engagement point and the second engagement point are situated on the suspension arm in a position which lies above a center point of the axle, wherein the damper is situated within the spring, and wherein the spring is a bellows.

10. The device of claim 9, wherein the damper is situated completely within the bellows.

11. The device of claim 10, wherein the axle components are situated between the axle and the chassis.

12. The device of claim 9, wherein the axle components are situated between the axle and the chassis.

13. The device of claim 9, wherein a connecting point of the suspension arm is situated on the chassis, a connecting point of the axle is situated on the suspension arm, and the first and second engagement points are situated on one line.

14. The device of claim 1, wherein the first engagement point is situated downstream from the second engagement point in relation to the axle, wherein the damper is situated within the spring, and wherein the spring is a bellows.

15. The device of claim 14, wherein the damper is situated completely within the bellows.

16. The device of claim 15, wherein the axle components are situated between the axle and the chassis.

17. The device of claim 14, wherein the axle components are situated between the axle and the chassis.

18. The device of claim 14, wherein a connecting point of the suspension arm is situated on the chassis, a connecting point of the axle is situated on the suspension arm, and the first and second engagement points are situated on one line.

* * * * *

UNITED STATES PATENT AND TRADEMARK OFFICE
CERTIFICATE OF CORRECTION

PATENT NO.       : 8,393,628 B2
APPLICATION NO. : 12/991312
DATED            : March 12, 2013
INVENTOR(S)      : Thomas Naber It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 78 days.

Signed and Sealed this
First Day of September, 2015

Michelle K. Lee
*Director of the United States Patent and Trademark Office*